May 25, 1943.  L. D. DANFORTH  2,320,032
LOCK NUT
Filed Oct. 20, 1941
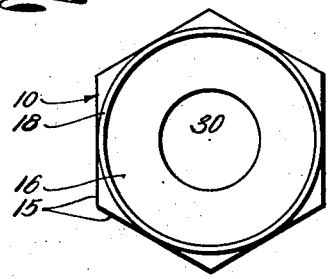
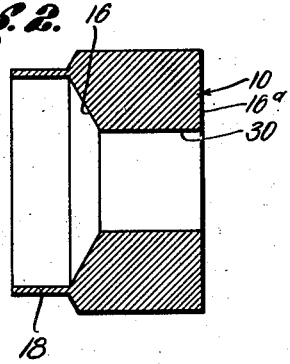
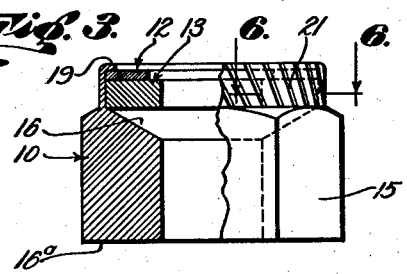
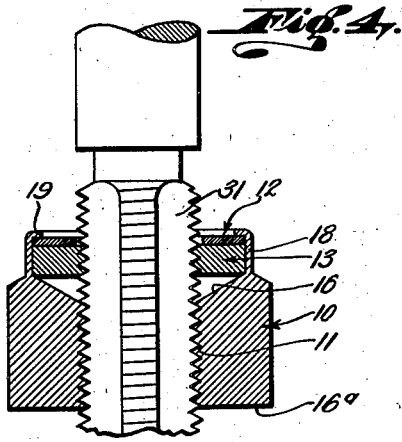
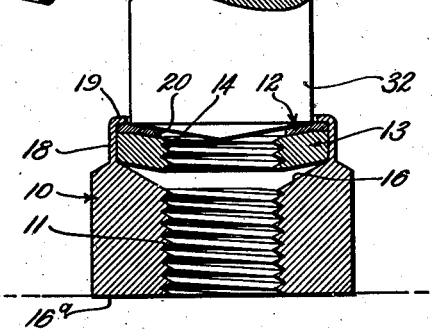
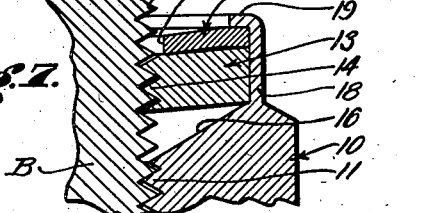
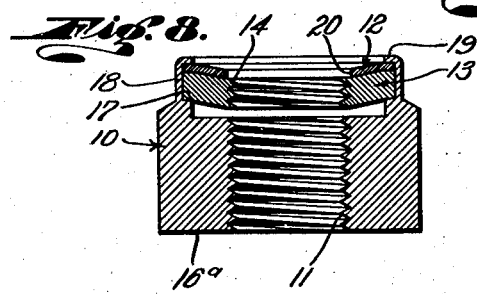
Inventor
Louis D. Danforth
By
His Attorney Patented May 25, 1943

2,320,032

UNITED STATES PATENT OFFICE 2,320,032

LOCK NUT

Louis D. Danforth, Los Angeles, Calif., assignor to Charles C. Akin, Los Angeles, Calif.

Application October 20, 1941, Serial No. 415,722

7 Claims. (Cl. 151—7)

This invention relates to attaching or securing elements and relates more particularly to lock nuts and methods of making the same. A general object of this invention is to provide a dependable and effective lock nut and a simple, economical and commercially practical method for making the same.

Another object of this invention is to provide a lock nut embodying novel and highly effective means for maintaining a positive axial thrust engagement between the load taking side surfaces of the threads of the nut body and bolt to resist unthreading and to positively prevent axial play, working and wearing of the threads.

Another and important object of this invention is to provide a lock nut embodying a fibrous material lock element provided with a pre-formed thread axially offset relative to the thread of the nut body so that its cooperation with the thread of the bolt maintains the active or load taking faces of the threads of the bolt and nut body in tight, frictional cooperation to resist unthreading of the nut and to prevent wearing and working of the threads.

Another object of this invention is to provide a lock nut of the character referred to in which the fibrous element is yieldingly maintained in the condition to have its thread axially offset relative to the thread of the nut body. In the improved lock nut of this invention a flexible resilient diaphragm member serves as a spring to maintain or yieldingly urge the fibrous element into a position where the load-taking surfaces of the threads are in tight frictional cooperation. The spring diaphragm member remains fully effective indefinitely and is operative to hold the fibrous element where its thread is offset axially from the thread of the nut body after repeated and continued use of the nut.

Another object of this invention is to provide a lock nut of the character referred to embodying novel means for holding the fibrous element against rotation.

Another object of this invention is to provide a lock nut of the character mentioned in which the resilient member or spring diaphragm is an independent element formed separately from the body of the nut and, therefore, may be given the strength and resiliency required in any given apparatus or situation.

Another object of this invention is to provide a lock nut of the character mentioned in which the spring diaphragm member and the fibrous element are shaped and mounted to have an effective diaphragm action assuring a positive effective locking engagement or movement resisting engagement between the threads of the nut and the thread of the bolt.

Another object of this invention is to provide a lock nut of the character referred to whose base may have full uninterrupted engagement with the work or bolted part and which may be formed and proportioned for engagement by typical tools and wrenches.

Another object of this invention is to provide a method for making a lock nut of the character above referred to in which the fibrous element and the nut body may be simultaneously tapped in a single operation.

A further object of this invention is to provide a method for making a lock nut of the character above referred to in which the fibrous element and the spring member or diaphragm are simultaneously shaped or distorted in a single operation to offset the thread of the fibrous element and to give the diaphragm member its active spring shape.

The various objects and features of my invention will be fully understood from the following detailed description of a typical preferred form of apparatus and a typical manner of carrying out the method of my invention, throughout which description reference is made to the accompanying drawing, in which:

Fig. 1 is a plan view of the nut body prior to the assembling of the fibrous element and diaphragm member. Fig. 2 is a central longitudinal detailed sectional view of the nut body. Fig. 3 is a side elevation of the nut with a portion appearing in longitudinal cross section showing the parts prior to the tapping and offsetting operations. Fig. 4 is a longitudinal detailed sectional view of the nut during the tapping operation. Fig. 5 is a view similar to Fig. 4 showing the spring diaphragm member and the fibrous element being offset. Fig. 6 is a fragmentary horizontal detailed sectional view taken as indicated by line 6—6 on Fig. 3. Fig. 7 is an enlarged fragmentary longitudinal detailed sectional view of the completed nut threaded on a bolt and Fig. 8 is a longitudinal detailed sectional view of a slightly modified form of nut.

It is believed that the method of the invention will be better understood following a description of the nut structure, and I will proceed with a detailed description of the nut and its mode of operation. The lock nut of the invention may be designed and proportioned for practically any use or application. In the drawing I have shown a lock nut of typical shape and proportions adapted for engagement by conventional wrenches or the like. It is to be understood that the invention is not to be construed as limited or restricted to the specific embodiment of the invention.

The improved lock nut of this invention may be said to comprise, generally, a nut body 10 having a thread 11 for cooperating with the thread T of a bolt B or the like, a flexible resilient spring element or diaphragm 12 on the body 10 and a threaded fibrous element 13 urged by the member 12 to a position where its thread 14 is offset axially relative to the body thread 11.

The nut body 10 is of the selected or required proportions and configuration. I have shown a hexagonal nut body 10 having the usual angular side surfaces 15 and having a plain flat base surface 16a. It will be observed that the base surface 16a is of full size and is uninterrupted. The central longitudinal opening of the nut body 10 carries the main thread 11 of the lock nut. The thread 11 is of selected or required type and pitch. In the case illustrated the thread 11 is a typical V thread. The outer or upper portion of the nut body 10 is formed to carry the diaphragm member 12 and the fibrous element 13. A central recess or socket 16 is formed in the upper end portion of the body 10. In the structure illustrated in Figs. 1 to 7, inclusive, the socket 16 has a downwardly and inwardly pitched lower or bottom wall while in Fig. 8 the bottom wall of the socket 16 is stepped downwardly and inwardly to have an annular upwardly facing shoulder 17 above its lower extremity. The side wall of the socket 16 is defined by an upstanding annular rim or wall 18. The wall 18 is integral with the nut body 10 and is preferably quite thin, as illustrated. An inturned lip 19 is formed on the upper end of the wall 18. The lip 19 is preferably annular or continuous and is substantially normal to the longitudinal axis of the nut body 10.

The spring element or diaphragm 12 serves to yieldingly urge the fibrous element 13 downwardly or inwardly. In accordance with the invention the diaphragm 12 is a preformed part assembled or secured in the body 10. The spring member or diaphragm 12 is a washer-like part proportioned to rather accurately fit within the wall 18. The periphery of the diaphragm 12 is gripped or engaged by the inner surface of the wall 18, as will be later described. The opening 20 of the washer-like diaphragm 12 is preferably larger in diameter than the opening of the nut body 10 and is adapted to pass or receive the bolt B with clearance. The spring member or diaphragm 12 is arranged in the upper or outer portion of the socket 16 and its upper surface bears against the under surface of the lip 19. The diaphragm 12 is formed or shaped to have effective movement resisting cooperation with the fibrous element 13. The diaphragm 12 is dished, having a substantial central portion which slopes downwardly and inwardly toward the central longitudinal axis of the nut. The diaphragm 12 may slope downwardly and inwardly from adjacent the lip 19 as illustrated in the drawing. It is preferred to construct the diaphragm 12 of a material having a substantial degree of resiliency. For example, the diaphragm may be formed of steel or other metal.

The fibrous element 13 is the lock member or movement resisting element of the nut. The element 13 is a washer-like part formed of a suitable selected fibrous material. The fibrous element 13 is proportioned and formed to have a selected degree of flexibility and resiliency. As illustrated throughout the drawings the element 13 is arranged in the socket 16 under the spring diaphragm 12. The lower surface of the diaphragm 12 is preferably in full contact with the upper surface of the element 13. The lower side of the element 13 rests on the bottom wall of the socket 16. Where the bottom wall of the socket 16 is tapered as in Figs. 1 to 7, inclusive, the lower peripheral corner of the element 13 rests on the tapered bottom wall where it joins the cylindrical side wall of the socket. In the structure illustrated in Fig. 8 of the drawing, the lower side of the element 13 rests on the shoulder 17. It will be observed that in both structures there is a substantial space below the fibrous element 13. The invention provides novel and effective means for locking or securing the fibrous element 13 against rotation. The element 13 is proportioned so that its periphery closely fits within the wall 18 when the nut is assembled. With the element 13 and the diaphragm 12 assembled in the socket 16 the wall 18 is knurled from its outer side. The knurling 21 is preferably sharp and deep so that the material of the thin wall 18 is displaced or distorted inwardly to form ridges 22 on the inner surface of the wall 18 which grip or bite into the fibrous element 13. Fig. 6 of the drawing illustrates the knurling ridges 22 and shows how they grip or hold the element 13. The knurling of the wall 18 forces the internal surfaces of the wall into tight gripping engagement with the periphery of the spring diaphragm 12.

The opening of the annular washer-like fibrous element 13 is of substantially the same diameter as the longitudinal opening of the nut body 10 and is provided with the thread 14. The thread 14 is of the same type and pitch as the main thread 11. It is a feature of the invention that the thread 14 is axially offset relative to a helical line continuing from the main thread 11 at the same pitch as the latter to provide for the locking action of the lock nut. As best illustrated in Figs. 5 and 8 of the drawing the major portion of the fibrous lock element 13 is dished or sloped downwardly and inwardly relative to the longitudinal axis of the nut, the pitch or slope of the element 13 being substantially the same as the pitch of the spring diaphragm 12. The offsetting of the thread 14 relative to the main thread 11 is determined by the degree or extent of pitching of the element 13. As will be later described in more detail the extent of offsetting of the thread 14 with respect to the thread 11 is an important factor in determining the degree of frictional engagement of the nut with the bolt B. The invention contemplates varying the extent of sloping or pitching of the spring diaphragm 12 and element 13 to provide for the locking action required in any given situation. In practice the thread 14 of the fibrous element 13 may be offset axially relative to the thread 11 a maximum distance, which is slightly less than the pitch of the thread but in many cases the offsetting of the thread 14 will be less than this maximum. It is to be understood that the fibrous element 13 is shaped to normally or naturally return to the condition where its major central portion is dished upon unthreading of the nut from the bolt B and the substantial resiliency of the spring diaphragm 12 urges the element 13 to return to its initial or normal shape.

In the use or operation of the lock nut the nut is threaded on the bolt B in the usual manner. In this connection it is to be observed that the nut may be engaged and operated by conventional wrenches and special tools are unnecessary. When the nut is threaded on the bolt B the outer or entering end of the bolt threads through the pre-threaded fibrous element 13. Owing to the axial offsetting of the thread 14 with respect to the thread 11 the cooperation of the thread T of the bolt B with the thread 14 forces the fibrous element 13 upwardly or outwardly. The cooperation of the offset thread 14 with the bolt thread T springs or forces the fibrous element 13 outwardly against the resiliency of the element 13 and against the spring diaphragm 12. In practice the diaphragm 12 may be constructed to offer substantial yielding resistance to this outward displacement or flexure of the element 13. The resistance to outward flexure of the element 13 offered by the element and the spring diaphragm 12 forces the active or load taking side surfaces of the threads T and 11 into firm frictional engagement. This frictional engagement of the broad active surfaces of the threads T and 11 dependably resists unthreading and loosening of the nut and positively prevents the threads from working and wearing. In cases where the nut and bolt assembly are subjected to severe vibration which momentarily and rapidly relieves the nut of its normal load, the axial thrust engagement of the active surfaces of the threads T and 11 prevents the nut from moving with respect to the bolt and thus prevents wearing of the threads. All play in the threads is automatically taken up immediately upon the threading of the bolt B through the fibrous element 13 and there can never be any play in the threads so long as the nut remains on the bolt. The outward or upward flexure and movement of the fibrous element 13 may be accompanied by inward movement of the thread 14 radially toward the longitudinal axis of the bolt B and this provides further frictional engagement between the threads to resist unthreading of the nut.

It is to be noted that the lock nut does not embody any parts which wear, score or distort the thread T of the bolt B. The thread 14 of the fibrous element 13 is formed prior to threading of the nut on the bolt and as a result the nut may be repeatedly applied to and removed from the bolt without any appreciable wearing of the thread 14 and without wearing or in any way injuring the thread T of the bolt B. The spring diaphragm 12 retains its resiliency indefinitely to urge the fibrous element 13 inwardly where its thread 14 is offset axially with respect to the thread 11. The spring diaphragm 12 being dished is particularly effective in resisting outward movement of the fibrous element 13 and in practice the diaphragm 12 may offer considerable resistance to outward movement and flexure of the element 13 and thus maintain a heavy axial thrust engagement between the active surfaces of the threads T and 11.

The method of the invention for forming the above described lock nut may be said to comprise generally the constructing or provision of the body 10, diaphragm 12 and element 13, the assembling and securing of the diaphragm 12 and element 13 in the body 10, the tapping of the body 10 and element 13 and the offsetting of the element 13.

The nut body 10, as initially provided or formed, may be as illustrated in Figs. 1 and 2. As shown in these figures the nut body 10 has the central longitudinal opening 30, the socket 16 and the tubular or annular wall 18. The socket 16 may be drilled in which case its bottom wall is tapered downwardly and inwardly as a result of the shape of the drill used in the drilling operation. The wall 18 is straight or cylindrical and as initially formed is devoid of the lip 19. The diaphragm 12 as initially provided or formed may be a simple washer-like part having horizontal or parallel upper and lower surfaces. The fibrous element 13 as initially provided may likewise be a simple, washer-like part having flat parallel upper and lower surfaces.

The diaphragm 12 and the fibrous element 13 are assembled in the socket 16 with the diaphragm 12 resting on the element 13 and with the element 13 resting on the tapered inner wall of the socket 16 or upon the shoulder 17 as the case may be. With the diaphragm 12 and element 13 in position the outer portion of the wall 18 is bent or turned downwardly and inwardly to constitute the lip 19. The lip 19 may be pressed, rolled or otherwise formed to bear inwardly against the outer surface of the diaphragm 12. This operation secures the diaphragm 12 and element 13 against axial movement. The wall 18 is then knurled to lock the element 13 and diaphragm 12 against relative turning. This knurling operation is performed to provide sharp, deep knurl grooves and to provide the above described ridges 22 on the interior of the wall 18 which positively lock the element 13 against turning. Upon the completion of the knurling operation the nut assembly is as illustrated in Fig. 3 of the drawing.

In accordance with the invention the body 10 and the fibrous element 13 may be tapped in a single operation. A suitable tap 31 is operated in the central openings of the body 10 and fibrous element 13 to form the threads 11 and 14. The tap 31 may be a typical or conventional tap operated in the usual manner. The tap 31 simultaneously forms the threads 11 and 14 in a single operation and produces threads 11 and 14 which are in axial alignment or order.

Following the above described tapping operation the diaphragm 12 is given its final pitched or dished shape and the fibrous element 13 is likewise given its dished shape to offset the thread 14 relative to the thread 11. This shaping of the diaphragm 12 and fibrous element 13 may be performed in any suitable or selected manner. In practice the diaphragm 12 may be pressed in, rolled in or hammered in. In Fig. 5 of the drawing I have indicated a tool 32 driving or pressing the diaphragm 12 inwardly. The tool 32 is readily engaged with the outer or upper surface of the diaphragm 12 exposed within the inturned lip 19. Upon the inward displacement or shaping of the diaphragm 12 and element 13 the lock nut is completed and ready for use.

Having described only a typical preferred form of apparatus and a typical manner of carrying out the method of my invention, I do not wish to be limited or restricted to the specific details herein set forth, but wish to reserve to myself any variations or modifications that may appear to those skilled in the art and fall within the scope of the following claims.

Having described my invention, I claim:

1. A lock nut comprising a nut body having an opening, a thread on the wall of the opening, a fiber element on the body having an opening aligned with the opening of the body, a thread on the wall of the last named opening, and a dished spring member on the body cooperating with said element to yieldingly urge it to a position where the last named thread is axially offset from a helical line extending from the first named thread at the same helical pitch as the latter.

2. A lock nut comprising a body having an opening, a thread on the wall of said opening, a non-metallic element non-rotatably secured to the body and having an opening aligned with the first named opening, a thread on the wall of the second named opening, and an annular metal spring member whose periphery is secured to the body and whose inner portion yieldingly bears against said element to distort said element into a shape where its thread is axially offset from a helical line continuing from the first named thread at the same helical pitch as said first named thread.

3. A lock nut comprising a nut body having an opening and a socket at an end of the opening, an element in the socket having an opening aligned with the first named opening, threads on the walls of said openings, and a dished annular spring member whose peripheral portion is secured in the socket and whose inner portion bears against the element to urge the element to a position where the thread of its opening is axially offset from a helical line continuing from the thread on the wall of the body opening at the same helical pitch.

4. A lock nut comprising a nut body having an opening and a socket at an end of the opening, an element in the socket having an opening aligned with the first named opening, threads on the walls of said openings, means for holding the element against rotation relative to the body, and a metal spring member secured in the socket for yieldingly urging the element to assume a shape where the thread of its opening is axially offset from a helical line continuing from the thread on the wall of the body opening at the same helical pitch, the spring member being dished inwardly toward the bottom of the socket to yieldingly hold the element in said shape.

5. A lock nut comprising a nut body having an opening and a socket at an end of the opening, a yieldable element in the socket having an opening aligned with the first named opening, threads on the walls of said openings, knurling on the wall of the socket holding the element against rotation, and a metal spring member secured in the socket and bearing against the element to yieldingly distort the element so that it assumes a shape where the thread of its opening is axially offset from a helical line continuing from the thread on the wall of the body opening at the same helical pitch.

6. A lock nut comprising a nut body having an opening and a socket at an end of the opening, a filer element in the socket having an opening aligned with the first named opening, threads on the walls of said openings, an inturned lip at the mouth of the socket, a metal spring member assembled in the socket and engaged between the lip and element, the spring member being shaped and formed to yieldingly hold the element in a distorted condition where the thread of its opening is offset axially relative to a helical line of the same pitch as and continuing from the thread of the body opening.

7. A lock nut comprising a nut body having an opening and a socket at an end of the opening, a fibrous element in the socket having an opening aligned with the first named opening, threads on the walls of said openings, an inturned lip at the mouth of the socket, a metal spring member arranged in the socket and engaged between the lip and element, the spring member extending radially and axially inward from said lip toward the longitudinal axis of the body to yieldingly hold the element deformed axially toward the inner wall of the socket so the thread on the wall of its opening is offset axially relative to a helical line continuing from the thread of the body at the same pitch.

LOUIS D. DANFORTH.